No. 743,792. PATENTED NOV. 10, 1903.
W. W. ADAMS.
TRANSMISSION GEAR.
APPLICATION FILED APR. 6, 1903.
NO MODEL. 2 SHEETS—SHEET 1.

WITNESSES:
J. A. Brophy
Isaac B. Owens.

INVENTOR
William W. Adams
BY
ATTORNEYS.

No. 743,792. PATENTED NOV. 10, 1903.
W. W. ADAMS.
TRANSMISSION GEAR.
APPLICATION FILED APR. 6, 1903.
NO MODEL. 2 SHEETS—SHEET 2.
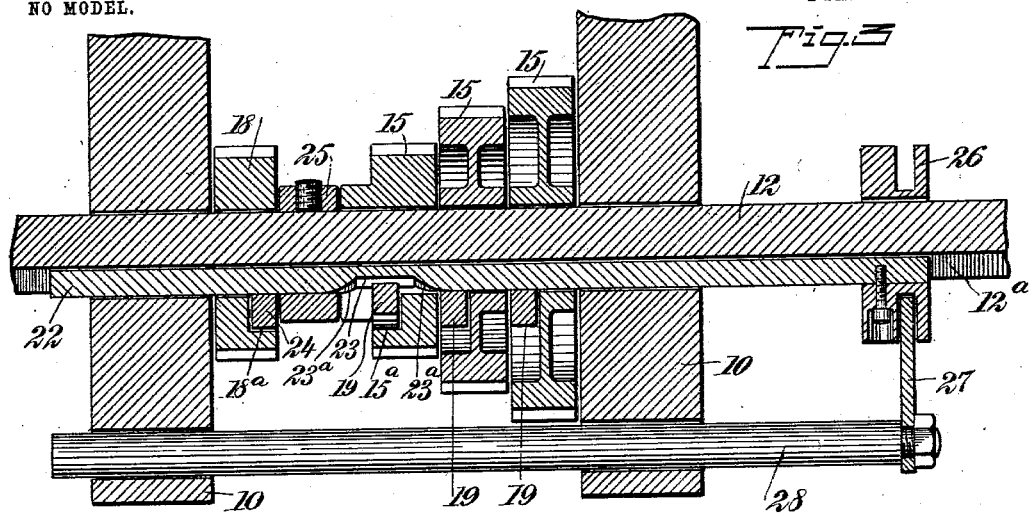
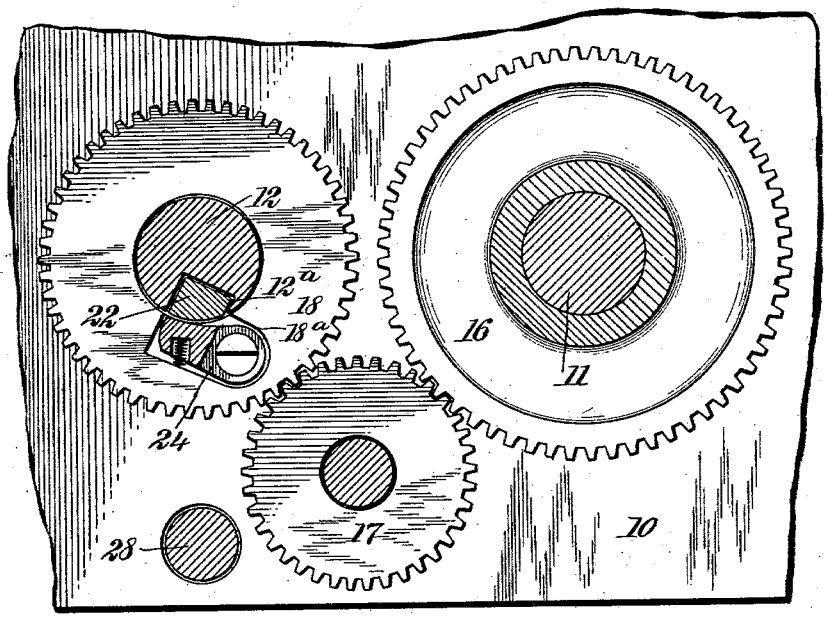
WITNESSES:
J. A. Brophy
Isaac B. Owens.
INVENTOR
William W. Adams
BY
Munn
ATTORNEYS.

No. 743,792.

Patented November 10, 1903.

UNITED STATES PATENT OFFICE.

WILLIAM W. ADAMS, OF BROCKTON, MASSACHUSETTS.

TRANSMISSION-GEAR.

SPECIFICATION forming part of Letters Patent No. 743,792, dated November 10, 1903.

Application filed April 6, 1903. Serial No. 151,290. (No model.)

*To all whom it may concern:*

Be it known that I, WILLIAM W. ADAMS, a citizen of the United States, and a resident of Brockton, in the county of Plymouth and State of Massachusetts, have invented a new and Improved Transmission-Gear, of which the following is a full, clear, and exact description.

This invention relates to a means for transmitting rotary movement in different directions and at varying speeds. The example here given involves three speeds in one direction and a single-speed reverse. It is useful in many connections, notably in the automobile art.

The apparatus comprises a number of sets of gears of varying ratio to transmit at different speeds and one or more additional sets of gears having intermediate gears to transmit reversely. These gears, excepting the intermediate gear or gears, are mounted on two axes, and along one axis runs a shifting key acting with devices on the adjacent gears to render them fast or loose on their shaft, as desired. When a gear is made fast to the shaft, transmission is effected through this gear at a speed depending upon the ratio of the gear to its mate and in direction depending upon the presence or absence of an intermediate gear or equivalent means.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
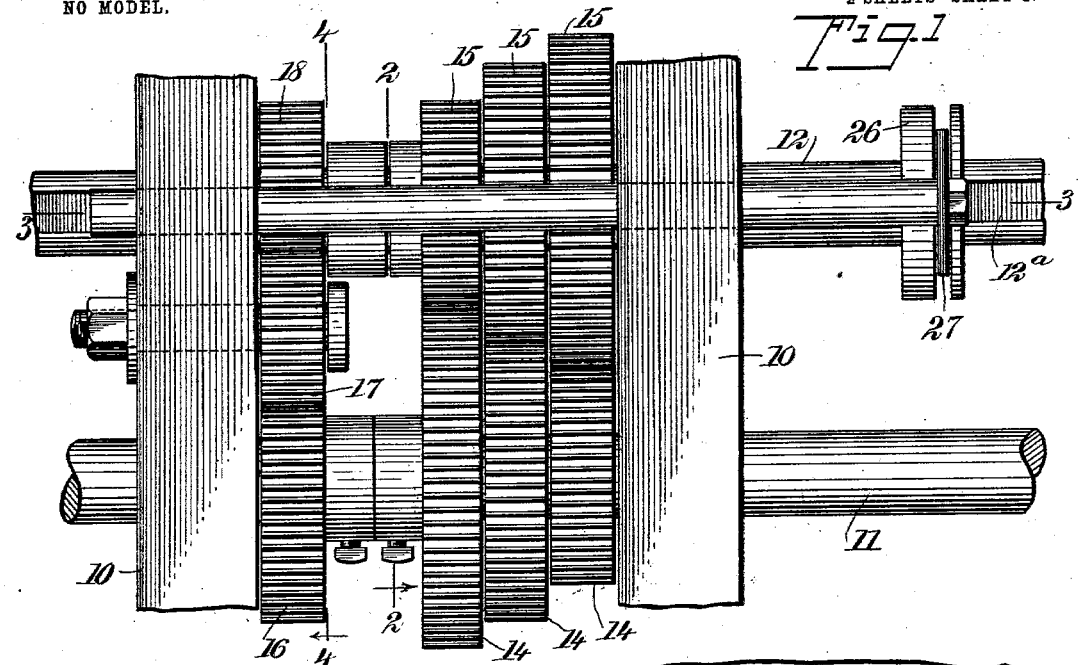
Figure 2:
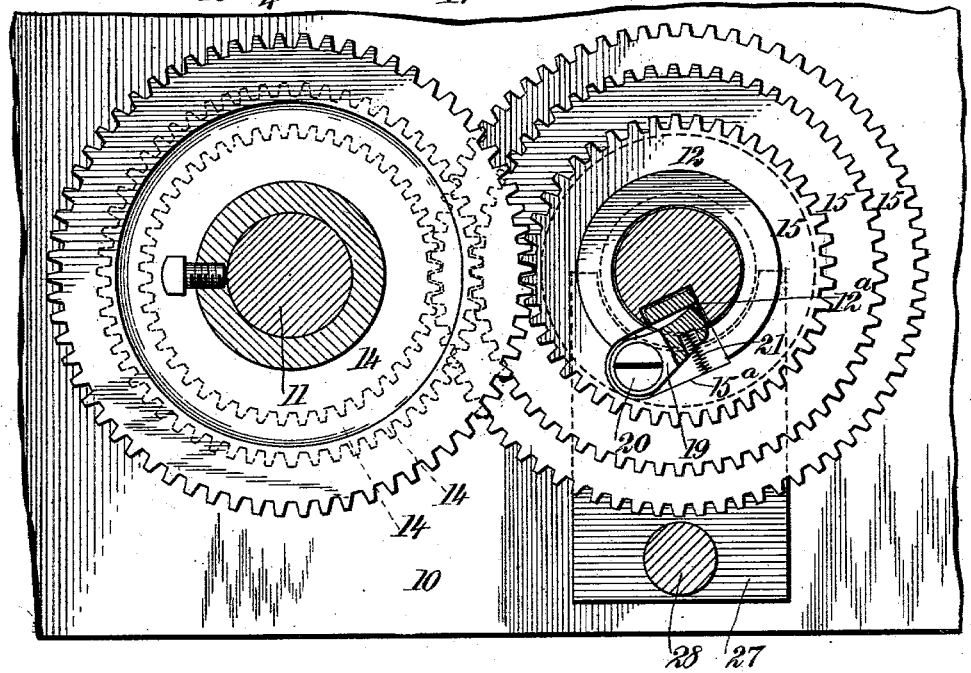

Figure 1 is a plan view of the invention. Fig. 2 is a section thereof on the line 2 2 of Fig. 1. Fig. 3 is a section on the line 3 3 of Fig. 1, and Fig. 4 is a section on the line 4 4 of Fig. 1.

According to the form here illustrated, 10 indicates the framing or mounting for the mobile parts of the invention, which framing may be of any desired form.

11 indicates the driving-shaft, and 12 indicates the driven shaft. On the shaft 11 are keyed or otherwise fastened three gears 14 of different diameters and meshed, respectively, with three gears 15, loosely mounted on the shaft 12, so that by fastening any one of the gears 15 to the shaft 12 said shaft will be driven at a speed depending upon the ratio of the then active gears. For driving the shaft reversely I provide a gear 16, fast to the shaft 11, an intermediate gear 17, suitably mounted in the frame, and a gear 18, loose on the shaft 12. By fastening the gear 18 to the shaft said shaft may be driven reversely with respect to the direction of movement caused by the gears 14 and 15. The gears 15 are formed with cavities $15^a$ in their hubs, these cavities communicating with the interior diameters or bores of the gears and carrying dogs 19, which are mounted by means of pivot-pins 20 or any other suitable means to work toward and from the shaft 12. Springs 21 are provided for pressing the dogs into active position.

The shaft 12 is formed with a longitudinally-extending keyway $12^a$, the side walls of which are of unequal width, and in this keyway works a key or spline 22, which is formed with a recess 23, extending clear across the key and terminating in slanting walls $23^a$, which run up into the plane of the outer face of the key. At the recess 23 the thickness of the key is equal approximately to the width of the narrow wall of the keyway. When the cavity 23 is opposite any one of the dogs $15^a$, the adjacent dog will drop into the cavity, and thus be engaged positively with the wider of the side walls of the cavity of the keyway $12^a$. Owing, however, to the peculiar form of said keyway and the location of the dogs with respect thereto, this engagement will take place only when the dog is moving in one direction. (See Fig. 2.) When the dog is moving in the other direction, it will play idly through the cavity in the keyway.

The gear 18 is formed with a cavity $18^a$, similar to the cavities $15^a$, and in this cavity $18^a$ a dog 24 is placed similar to the dogs 19. This dog 24 coacts with the gear 22 precisely the same as the dogs 19. A collar 25 is placed between the gear 18 and the next adjacent gear 15, this collar being fast on the shaft 12, and when the cavity 23 of the key 22 is run into the collar 25 all of the dogs 19 and 24 will be held inactive in the manner shown in Fig. 4.

26 indicates a collar in connection with the key 22, this collar being adapted to be engaged by any suitable means for shifting the key. An arm 27 is also engaged with the collar 26 and fastened to a slide-rod 28, which is mounted in the frame, these parts 27 and 28 steadying the key 22 and preventing it from binding in the keyway of the shaft 12.

The operation of the invention will be readily understood by persons skilled in the art, it being only necessary to shift the key 22 to place its cavity 23 opposite the dog of the gear which it is desired to fasten to the shaft 12, and if it be desired wholly to stop the transmission of movement this may be effected by moving the cavity 23 within the collar 25. It will also be observed in connection with this construction that while the gear drives in the intended direction with absolute certainty and without loss of movement nevertheless should the shaft 12 run ahead of its driving-gear this will not disadvantageously affect the operation of the parts, since in this case the shaft 12, with its key 22, will simply ride ahead of the dog. As the dog subsequently overtakes the shaft 12, it will reengage the side wall of the groove 12ª, the same as shown in Fig. 2.

The principle of the sliding key to fasten a gear to or unfasten it from a shaft may be put to use in various connections other than that here shown, as will be apparent to skilled mechanics.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a driving-gear, a driven gear, a shaft on which the driven gear is normally loose, said shaft having a longitudinally-extending keyway, a key adjustable in the keyway and having a recess therein, and a dog carried by the driven gear.

2. The combination of a gear, a shaft on which the gear is normally loose, said shaft having a longitudinally-extending keyway, a key adjustable in the keyway and having a recess therein, and a dog carried by the gear and coacting with the keyway of the shaft.

3. The combination of a gear, a shaft on which the gear is normally loose, said shaft having a longitudinally-extending keyway, a key adjustable in the keyway and having a recess therein, and a dog carried by the gear and coacting with the keyway of the shaft, said keyway having one wall narrower than the other wall and the key at the recessed portion being of a thickness equal approximately to the width of the said narrow wall.

4. The combination of a gear, a shaft on which the gear is normally loose, a dog mounted on one of said parts, and a key mounted on the other of said parts and adjustable thereon, for the purpose specified.

5. The combination of a gear, a shaft on which the same is normally loose, one of said parts having a keyway, the walls of which are of unequal width, a recessed key sliding in the keyway, and a dog carried on the other part and arranged to coact with the wider wall of the keyway.

6. The combination of a plurality of driving-gears, a plurality of driven gears meshed therewith, said gears being of varying sizes, for the purpose specified, a shaft on which the driven gears are normally loose, said shaft having a keyway therein, a recessed key running through the keyway, and a dog mounted on each of the driven gears and coacting with the key and shaft.

7. The combination of a plurality of driving-gears, a plurality of driven gears, an intermediate gear interposed between two of the first-named gears, a shaft on which the driven gears are loosely mounted, said shaft having a keyway therein, a key movable longitudinally in the keyway and a dog fastened to each of the driven gears and coacting with the key and with the shaft.

8. The combination of a shaft having a keyway therein, a key movable through the keyway and having a recess, a collar in connection with the key, an arm projecting from the collar, a sliding guide-rod connected with the arm, a gear mounted loosely on the shaft, and a dog carried by the gear and coacting with the key and shaft.

9. The combination of a plurality of driving-gears, a plurality of driven gears, a shaft on which the driven gears are loosely mounted, a collar mounted loosely on the shaft, said shaft having a keyway therein, a key adjustable in the keyway and having a recess therein, the key being fastened to the collar, and dogs mounted on the driven gears.

10. The combination of a shaft, a gear normally loose thereon, a dog on one of said parts, a key on the other of said parts and adjustable for the purpose specified, and a second gear meshed with the first-named gear, one of said gears being driven from the other.

In testimony whereof I have signed my name to this specification in the presence of two subscribing witnesses.

WILLIAM W. ADAMS.

Witnesses:
SEWELL P. HOWARD,
ALBERT H. FULLER.